Aug. 12, 1924.

S. B. WHITE

PAY ROLL COMPUTING MACHINE

Filed July 29, 1920   10 Sheets-Sheet 6

Samuel B. White, Inventor.

By his Attorneys

Kerr, Page, Cooper & Hayward

Aug. 12, 1924.

S. B. WHITE 1,504,801

PAY ROLL COMPUTING MACHINE

Filed July 29, 1920  10 Sheets-Sheet 10

Inventor
Samuel B. White
By Attorneys

Patented Aug. 12, 1924.

1,504,801

UNITED STATES PATENT OFFICE.

SAMUEL B. WHITE, OF BARRINGTON, RHODE ISLAND.

PAY-ROLL-COMPUTING MACHINE.

Application filed July 29, 1920. Serial No. 399,718.

*To all whom it may concern:*

Be it known that I, SAMUEL B. WHITE, a citizen of the United States of America, residing at Barrington, in the county of Bristol and State of Rhode Island, have invented certain new and useful Improvements in Pay-Roll-Computing Machines, of which the following is a full, clear, and exact description.

In large industrial plants or other establishments where there are many employees to be paid off weekly, semi-monthly, or at other periods, it is generally customary to put the exact amount of each employee's wages due in pay envelopes for personal delivery. If the number of employees be not large, it is not a matter of much difficulty to figure out from the pay roll the exact total number of bills, halves, quarters, dimes, nickels and cents that will be required to make up the exact amount for each employee's pay envelope, and to obtain these from the bank. But when the number is large, perhaps running into the thousands, such a compilation in intricate and laborious.

It has, therefore, been the custom to draw from the bank an amount representing the total of all the wages, in bills of different denominations, and in addition, a relatively large sum in halves, quarters, dimes and smaller coins to make up the exact amounts required. Experience, however, has shown that it is very difficult to keep track of and account properly for this additional sum, and any large establishment expects to register a loss of greater or less extent due to this practise whenever pay rolls are made up.

The subject of my present application for Letters Patent is an office machine which is designed to obviate this difficulty entirely, and by a simple and rapid operation to indicate the exact number of bills of any denomination, the exact number of halves, quarters, dimes, nickels and pennies that may be required to make up the precise amount of each employee's pay, whatever the number of these latter may be, so that in drawing the total amount for the aggregate pay roll, it is a mere matter of writing down from the counters of the machine, the number of each bill or coin that may be required for all the envelopes. The machine may be regarded and designated therefore as a pay roll computing machine.

Aside from its function both in general and in the certain specific respects hereinafter noted, the machine embodies few radically new or different mechanisms from those that have heretofore been employed in machines of this general class. It comprises a bank of keys of the usual character, a series of indicating segments controlled thereby, a series of type segments operated in accord with the indicating segments, a series of counters operated by the indicating segments, and intermediate selective devices which determine what figures of value corresponding to bills, or coins are displayed or are brought to the printing position, in order that an impression of the amount set up may be printed on each pay envelope in a manner to indicate what bills and what coins are to be placed in said envelopes.

Each display segment has its corresponding counter and after a series of operations these counters will show at a glance what bills and what coins, in kind or value and number, are to be obtained in order to make up the exact amount of each and all the individual amounts registered by the operation of the keyboard.

For an understanding of the details of the mechanism required for this purpose, reference is now made to the accompanying drawings, in which.

Primarily the machine is provided with a keyboard 1 which may be of any proper character and construction. I prefer to use the standard keyboard of the Burroughs adding machine, and have adopted generally its construction, in so far as the locking down of a depressed key, its release by the depression of another key, the operation of a repeat key, and the like are concerned. A special advantage follows from the use of this particular keyboard in the fact that the machine may be placed immediately over a Burroughs adding machine, and connections made from the stems 3 of its keys 2 to the keys 4 of such adding machine, whereby the operation of my device will register in the adding machine the total or aggregate of all the values represented by all of the keys depressed, thus giving not only the total of all the amounts registered which represents the sum to be drawn from the bank, but the number and value of all the items which go to make up this total.

When a key 2 is depressed it rocks on a pivot 6, a plate or arm 5, that passes through a slot in the key stem 3. Rigid with such plate 5 is an arm 7, connected by a wire 8, with a guided slide 9 which normally enters a slot or notch in the forward edge of one of a plurality of horizontal plates 10. There are as many horizontal plates 10 as there are keys in the keyboard, and they are laid one above the other in a vertical column, and are supported in parallelism by cross rods 11, each plate 10 having a depression which fits over a rod 11 to retain the plates in proper alignment.

The horizontal plates 10 are locked in position by the engagement therewith of the slides 9, but when a given key is depressed, it withdraws the slide and releases or unlocks its horizontal plate and being locked down leaves it unlocked.

Figure 1:
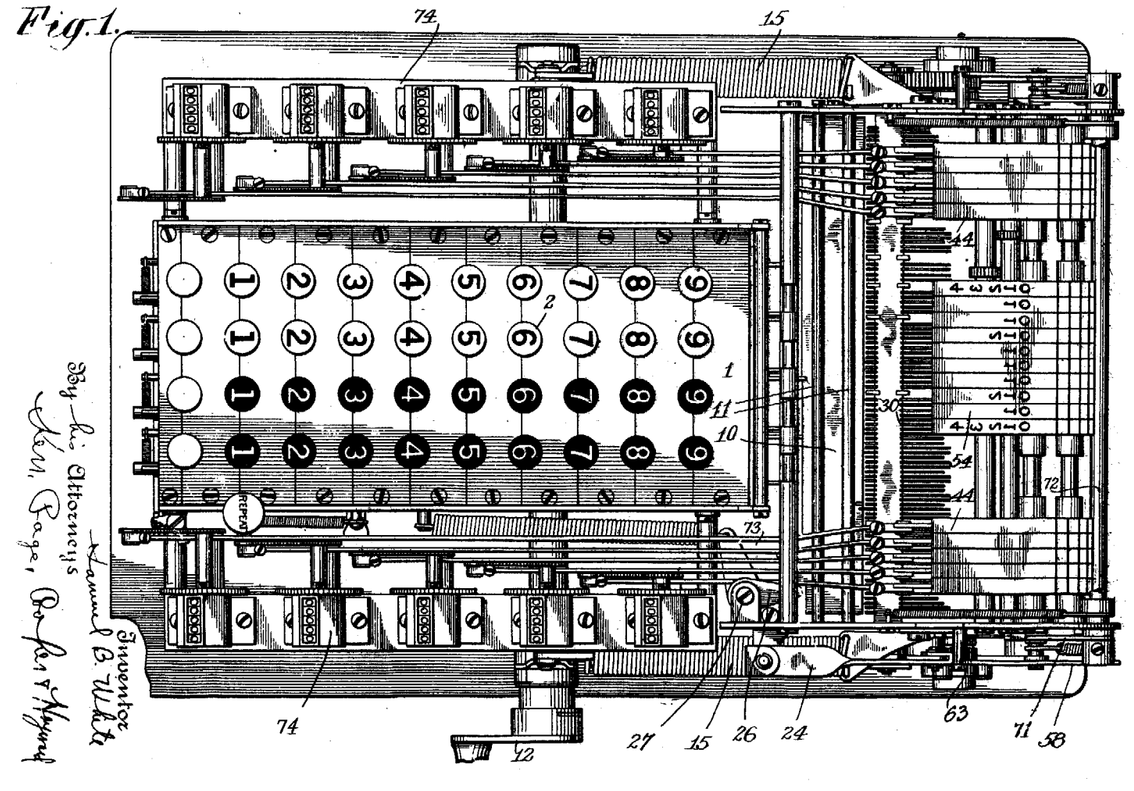
Fig. 1 is a top plan view of the complete machine.

Following now a simple operation of the device, for a more ready understanding of its construction, assume that the key at the bottom of the right hand column of Fig. 1 and which represents one penny be depressed. The next operation is the pulling down of a handle 12, at the right of the machine, which is pivoted at 13, and rigid with an upright arm 14. The arm 14 has connected with it strong retractile springs 15, and is connected by a link 16 with an arm 17 pivoted at 18 and rigid with a toothed segment 19. This segment gears with and by its rotary movement imparts a partial rotation to a shaft 20.

Figure 2:
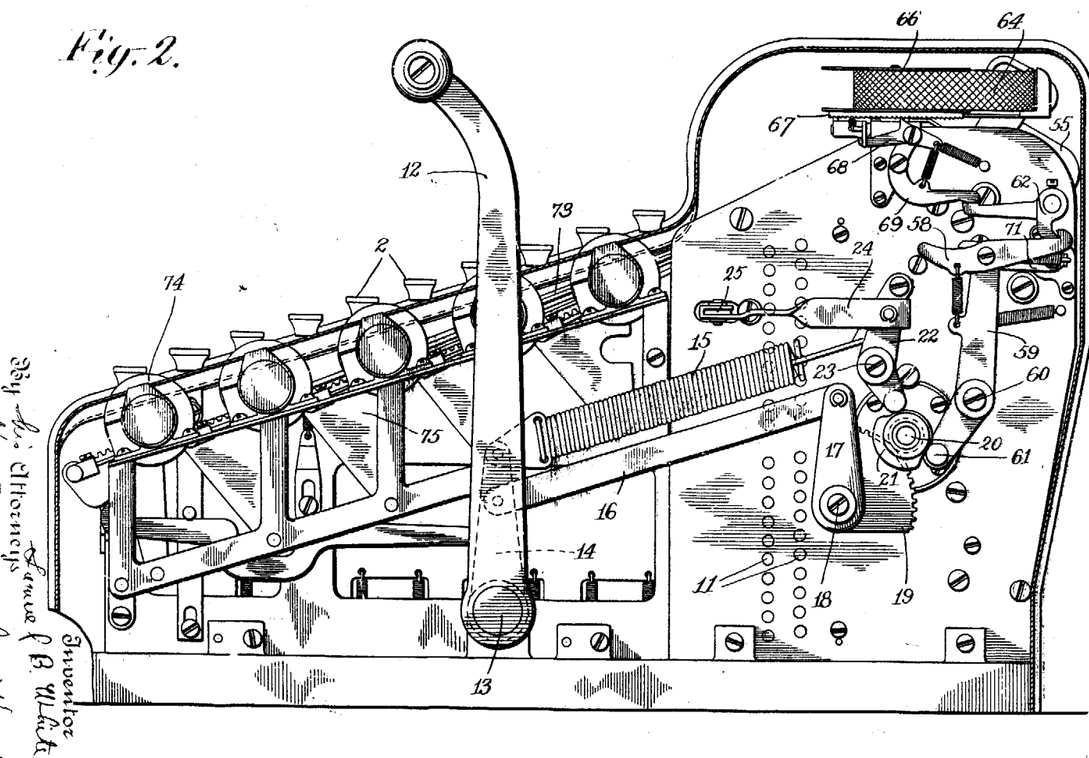
Fig. 2 is a view in side elevation of the same.
Figure 3:
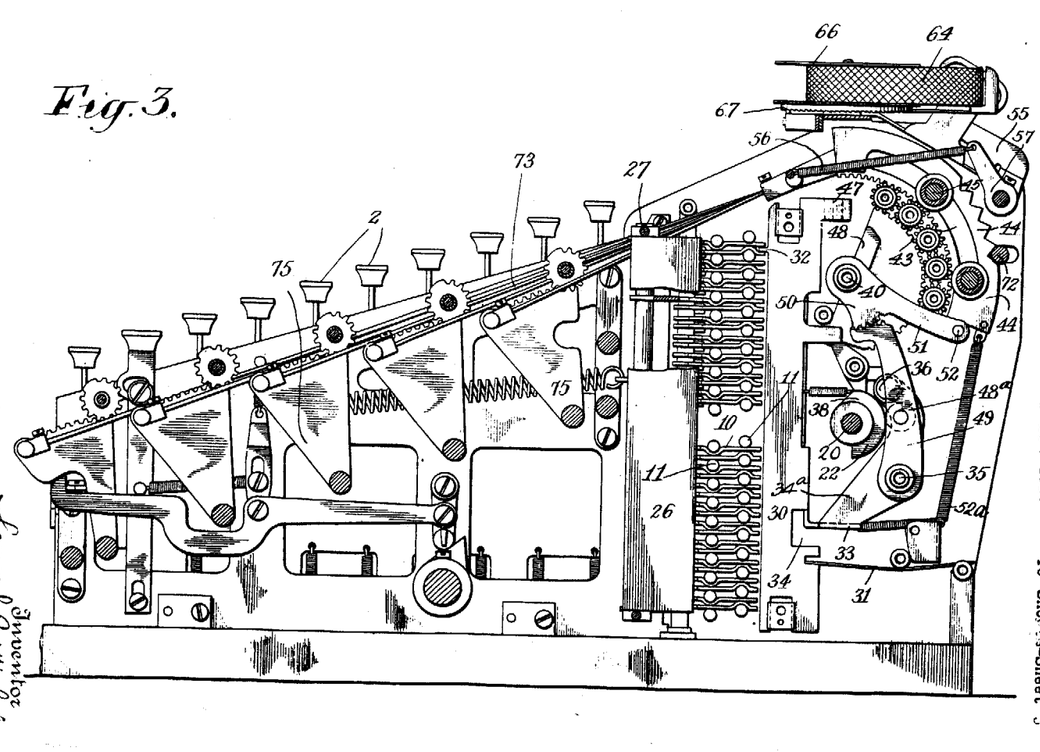
Fig. 3 is a similar view of the machine with the side plates removed to exhibit the interior mechanism.
Figure 5:
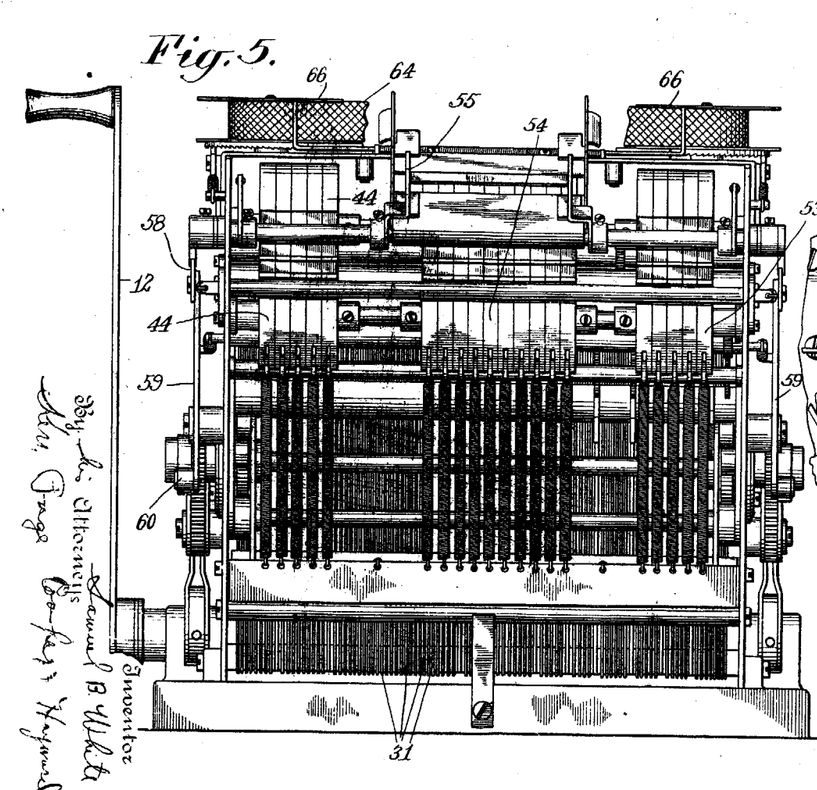
Fig. 5 is a rear end view in elevation of the machine.
Figure 6:
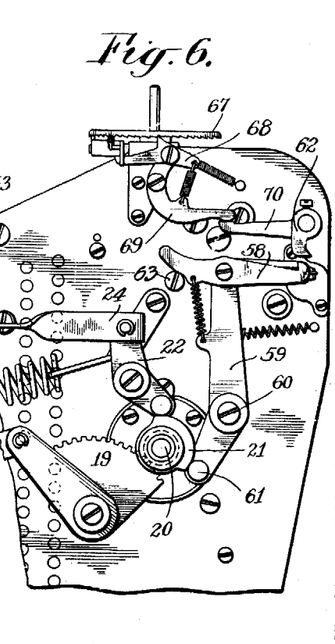
Fig. 6 is a detail of the parts shown at the right of Fig. 2, the said parts being shown in a different position.

The shaft 20, see Figs. 2, 5 and 6 carries outside the side plate of the machine a cam 21, upon which bears a roller carried by a lever 22 pivoted at 23 and connected by a link 24 to an arm 25, (see Fig. 7), that is rigid with a plate 26, mounted to swing about a vertical axis 27. Each horizontal plate 10 has a projection 28, which, by means of a spiral spring 29, is connected to the plate 26 near its free or swinging edge. When the cam 21 is rotated the arm 22 is operated and forces the link 24 to the left, Figs. 2 and 6, thereby swinging the plate 26 in a direction that distends all of the springs 29, causing them to pull upon all of the horizontal plates 10. Only that plate, however, which has been released or unlocked can respond to this force, and the unlocked plate alone moves in response thereto.

Associated with the horizontal plates 10 are a plurality of vertical plates 30, properly guided to move vertically and each impelled downward by gravity and by springs 31 which engage with notches in their edges. These plates are not permitted to drop because of one or more projections 32 on each which normally lie over the edge of one or more of the horizontal plates 10. They are furthermore prevented from dropping by a universal bar or plate 33, which, in the normal condition of the machine, lies in a line of notches 34 in the vertical plates and immediately under the edges of such notches. The bar or plate 33 is carried by levers 34ª pivoted at 35, and one of these levers carries a roller 36 that, by the action of a spring 37, is maintained in contact with a cam 38 carried by the shaft 20 immediately inside the side plate of the machine. Normally, as, has been stated, the free end of lever 34ª is forced to the right and the universal bar 33 constitutes a stop for all of the vertical levers.

Figure 4:
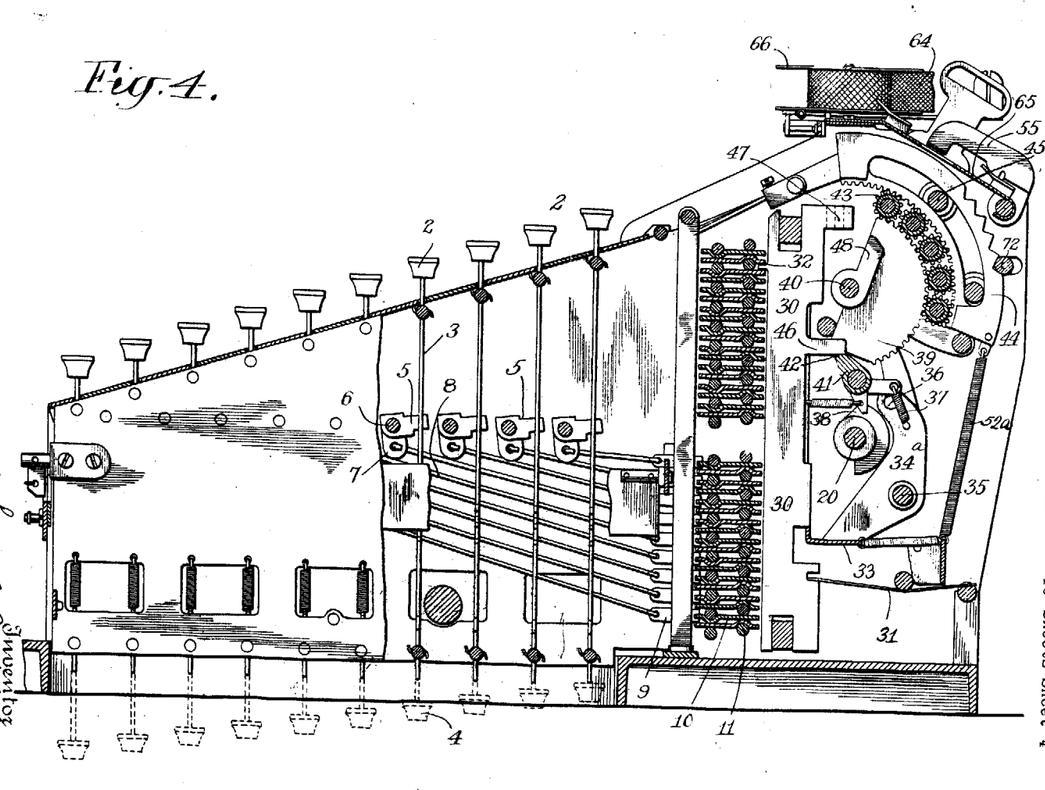
Fig. 4 is a broken section with a portion of a plate removed to illustrate still further the details of mechanism.
Figure 7:
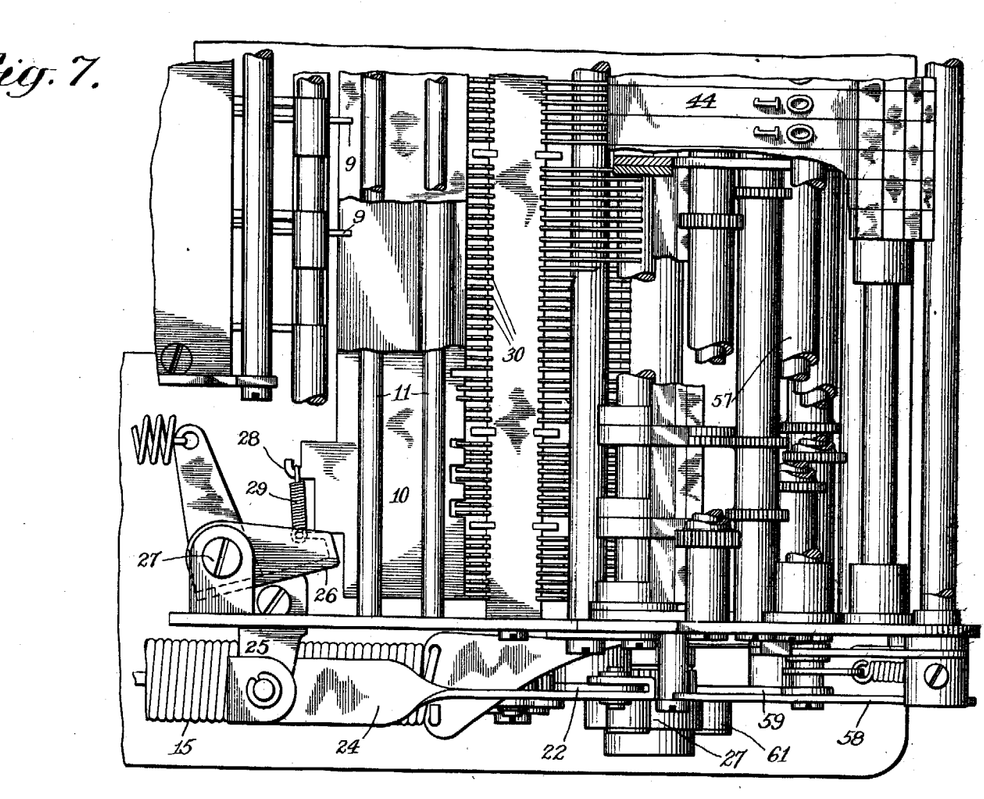
Fig. 7 is a top plan and part sectional view on an enlarged scale of a portion of the right hand end of the machine as shown in Fig. 1.
Figure 8:
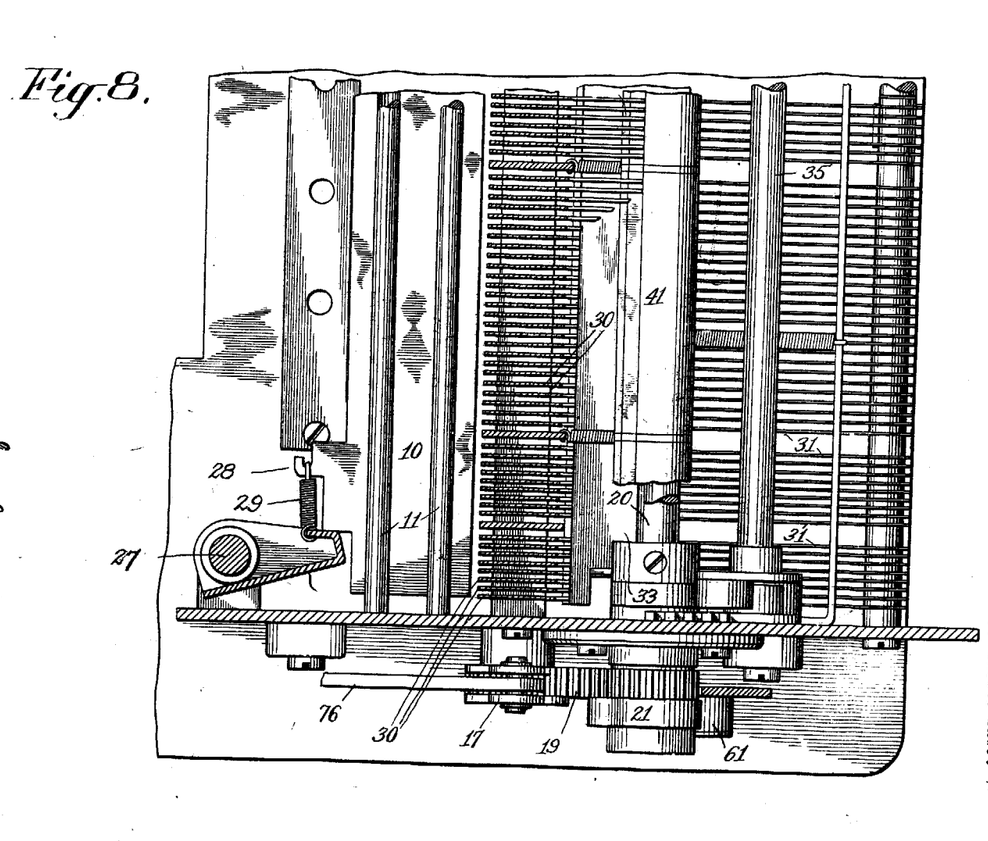
Fig. 8 is a view of the under parts of the same portion of the machine shown in Fig. 7.

Referring now for a moment to Figs. 4, 5 and 7, it will be observed that the vertical plates 30 are arranged in groups. The first group of eight plates is that which contains the plates corresponding to pennies. The next group of nine plates corresponds to nickels, the next of twenty six plates to dimes, and so on, the reason for the different number of plates in each group will appear later. Taking, however, the penny group for illustration. There is associated with it a toothed segment 39 pivoted at 40, and this segment is normally prevented from rotation by the engagement of a bar 41 with a projection 42 in said segment.

The segment 39 meshes with a pinion 43 on a sleeve on a transverse shaft, and this pinion, or another on the same sleeve, meshes with a curved rack on one of five segmental plates 44, all of which have curved slots through which extend guiding rods 45. The plate 44 is the indicating segment corresponding to pennies, the next segment to the left to nickels, the next to dimes, the next to quarters and the fifth to halves. There is one segmental plate 39 for each group of vertical plates, and each of such plates meshes by pinions 43 directly or indirectly with one of the indicating segments 44.

All of the eight vertical penny plates have projections 46 which lie over the pivoted locking bar 41, and when any one of such plates drops, it swings said bar down and out of engagement with the segmental plate 39 and leaves that plate free to swing.

Each vertical penny plate has also a projection 47 at the top of predetermined length, and when a plate drops the projection 47 falls into the path of movement of a stop 48 carried by the plate 39 and extending over the whole group of eight penny plates.

Proceeding now under the assumption made, that the one penny key has been depressed, it follows that the corresponding horizontal plate has been shifted, by the means described, and thereby brought to a position which leaves the corresponding vertical plate free to drop. Movement of the handle turns the cam 38 with the result that lever 34ª dropping off cam 38 unlocks the vertical plates so that that corresponding to one penny drops and releases the segmental plate 39. The cam 38 by its rotation also permits a roller 48ª carried by a lever 49 pivoted at 35 to drop off, and this lever has a rack at its end which engages with a rack 50 on an arm 51 pivoted on the shaft 40 that carries a bar 52 that normally lies under the lower ends of the five segmental plates 44. Each of these plates has a spiral spring 52ª connecting it with the frame and tending to pull it down over its guiding rods.

As soon, therefore, as the arm 51 is free to drop by the lever 39 dropping from the cam 38, it is lowered by the tension of the spring connected with the penny indicating segment. The penny segmental plate 39 being now free is rotated counter clockwise by the segmental plate 44, which is moved clockwise, and this movement continues until the stop 48 carried by the moving plate 39 encounters the projection on the dropped vertical penny plate. This projection extends to a point where it stops the segmental plate and the penny indicating segmental plate in a position to bring the Figure 1 which may be marked or engraved on the periphery of such segment at the indicating point.

What happens in the case described happens for any other key. A two dime key, for example, permits the horizontal plate corresponding thereto to slide, this permits the two dime vertical to drop, releases the segmental plate for the dime group of verticals and the dime segmental indicating plate turns until it is stopped at the point where it indicates two dimes. The same operation applies to the quarters and the halves.

In illustration of this, each denomination of money has a bank of vertical plates, and each unit of money has a horizontal plate, and what is true of the penny and nickel vertical banks is true also of the others. For example, if key 5 of the second row from the right be depressed, its horizontal plate 10 moves to the left, and brings its slot in line with the first vertical 30 in the fifty bank and allows that vertical to drop. This permits the arm 48 on the segment corresponding to halves to swing until it encounters the stop 47 and registers 50 cents, or one division.

If, however, 75 cents is to be registered the 7 key in the second column and the 5 key in the first column are both depressed. The secret of this is to shift the horizontals corresponding to these two keys, and the slots in these horizontals are so placed that the slots in the horizontal of the 7 key aligns with a vertical 30 in the 50 cent bank, and a vertical 30 in the quarter bank, and consequently one 50 and 25 cent piece are registered.

It follows from this operation that there must be a plurality of verticals in each bank because different verticals must be locked or released by the different combinations. The number required has been worked out empirically and is the minimum.

At the right hand of the machine, shown in Fig. 5, are five segmental plates 53. These are operated by the same means as the others, but they represent one, two, five, ten and twenty dollars respectively, and are operated only when the keys corresponding to such amounts are depressed.

Midway between the two banks of five indicating segments is a group of ten segments 54. These are designed to carry type indicating pennies, nickels, dimes, quarters, halves and five dollar values. When any key up to fifty cents is depressed and its corresponding indicating segment 44 turned to show the amount, the sleeve carrying its segmental plate 39 transmits the motion to a corresponding segmental plate under the center group and these operate to turn the corresponding type segment to the same position. In a similar manner, when any indicating segment 53 is operated its movement is carried back and imparted to the corresponding printing segment.

Above the middle bank of ten type segments 54 is pivoted a printing hammer 55 on a shaft carrying a rigid arm 57, connected to the frame by a special spring 56 which holds the hammer normally down. In this position an arm 62 on the hammer shaft outside the frame, Figs. 2 and 6, is engaged by the hooked end of a lever 58, pivoted to one arm of a lever 59, pivoted at 60 and carrying a roller 61 that is held against the cam 21. When the handle is operated and the cam 21 rotated the lever 57 carries the spring actuated lever 58 to the left and this, by its engagement with arm 62 rigid with the printing hammer, raises the latter against the force of the spring 56. The lever 58 has a curved end which rides on a stop 63, set in the side of the frame, and by this stop the lever in its movement to the left is lowered out of engagement with the arm 69, and the instant that said arm is thus freed, the printing hammer operates upon a ribbon 64 to print upon a pay envelope inserted on a platen 65 the amount which is indicated by the position of the type on the middle bank of segments.

The inking ribbon 64 is carried on spools 66, one of which has a circular ratchet 67 with which a pawl 68, operated by a lever 69, engages. The lever 69 is spring actuated and is raised by the lifting of the printing hammer by an arm 70 rigid with the shaft of said hammer. In this way the inking ribbon is fed.

After the printing is accomplished and the handle released the cams 21 and 38 revolve back to their original positions. This swings the plate 26 to its normal position, in which movement its edge encounters and returns to normal position any horizontal plate 10 that may have been unlocked and shifted. The same operation also swings the lever 49, which raises the arm 51 and lifts any of the indicating segments that may have been moved, and this restores the segmental plates 39 to normal position. The same cam swings the lever 34 and causes the plate 33 to lift any dropped vertical plates thus allowing the stop bar 41 to lock the displaced segmental plate 39. By the same operation the lever 59 is shifted and the lever 58 caused to again engage with the arm 62. Thus, after each cycle of operation all parts are restored automatically to zero position.

To the lever 59 are connected by links 71 a bar 72 which enters notches in the segmental plates as the lever is drawn forward, and brings said plates into exact and proper position and locks them there while the printing is being done.

In order to indicate the total number of each bill or coin that is required after a series of operations each one of the segments of the side banks is connected by a wire 73 with a counter 74. These counters may be of any ordinary construction, and are shown as being operated by pivoted segmental plates 75 meshing with the counter shafts. The indications of a counter will therefore depend upon the extent of movement of the indicating segments, and each counter will show the number of pennies or of dimes or other bills or coins which the machine has been operated to show or to print.

In the above description no special care has been exercised to indicate the precise form and character of the mechanism employed, as its function or operation is of far greater importance and in detail it may be very greatly varied. It may be noted, more especially, that the description has been confined largely to those parts which appear on one side of the machine only, but it will be understood that in all cases where it is necessary or desirable, these parts are duplicated on the other side. This is clearly indicated and illustrated in the drawings which constitute a complete guide to any one skilled in the art who may undertake to build the machine.

Figures 9, 10:
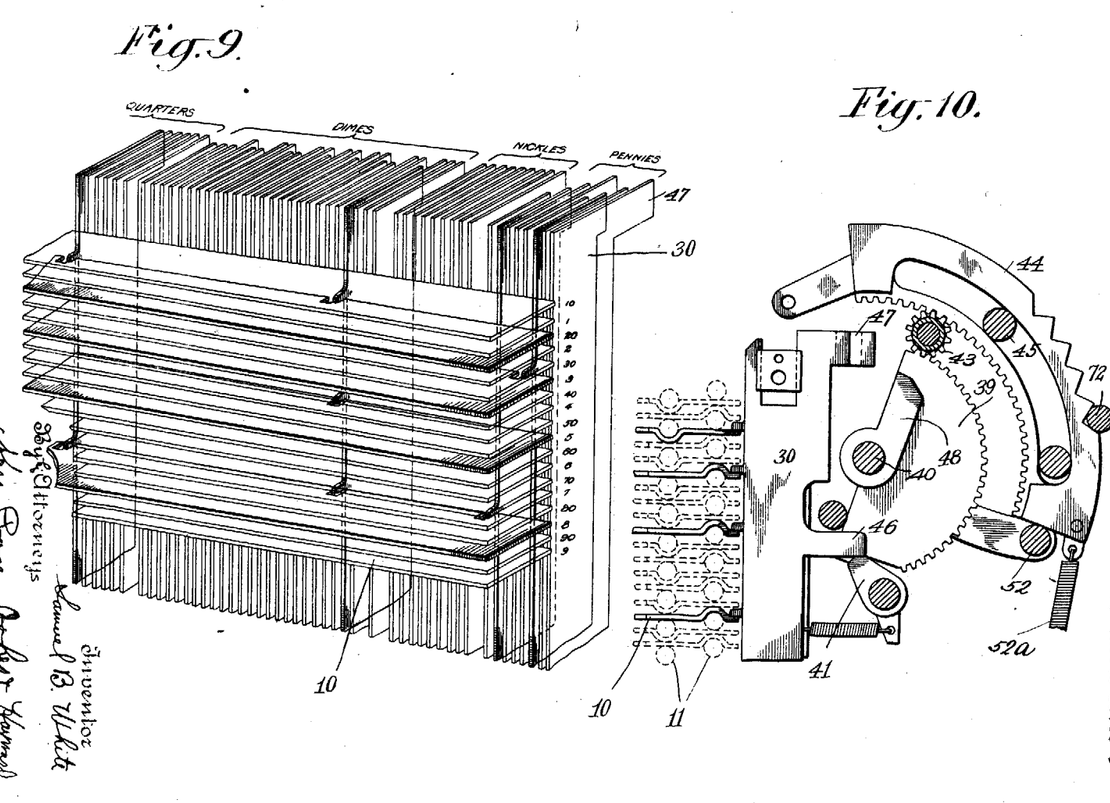
Figs. 9, 10, 11, 12, 13 and 14 are views intended to be mainly diagrammatic of the selective devices, and the display or printing mechanism, which illustrate the mode of operation of the machine, and will be more fully understood from the description which follows.
Figures 11, 12:
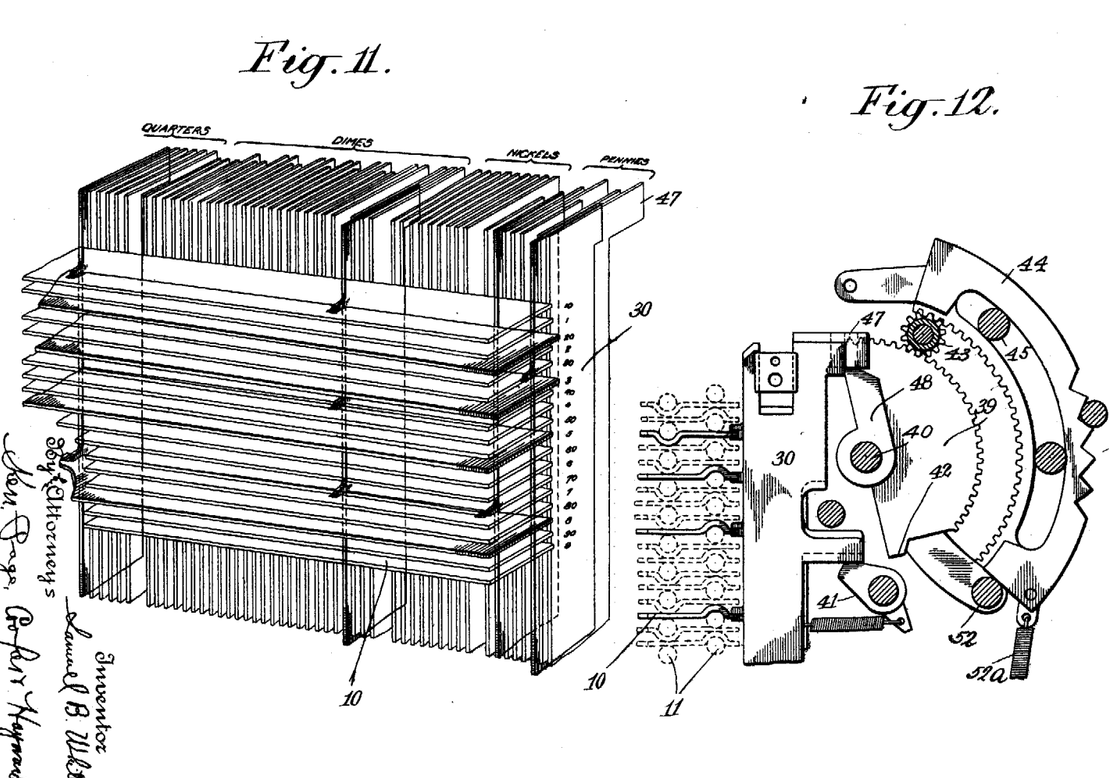
Figures 13, 14:
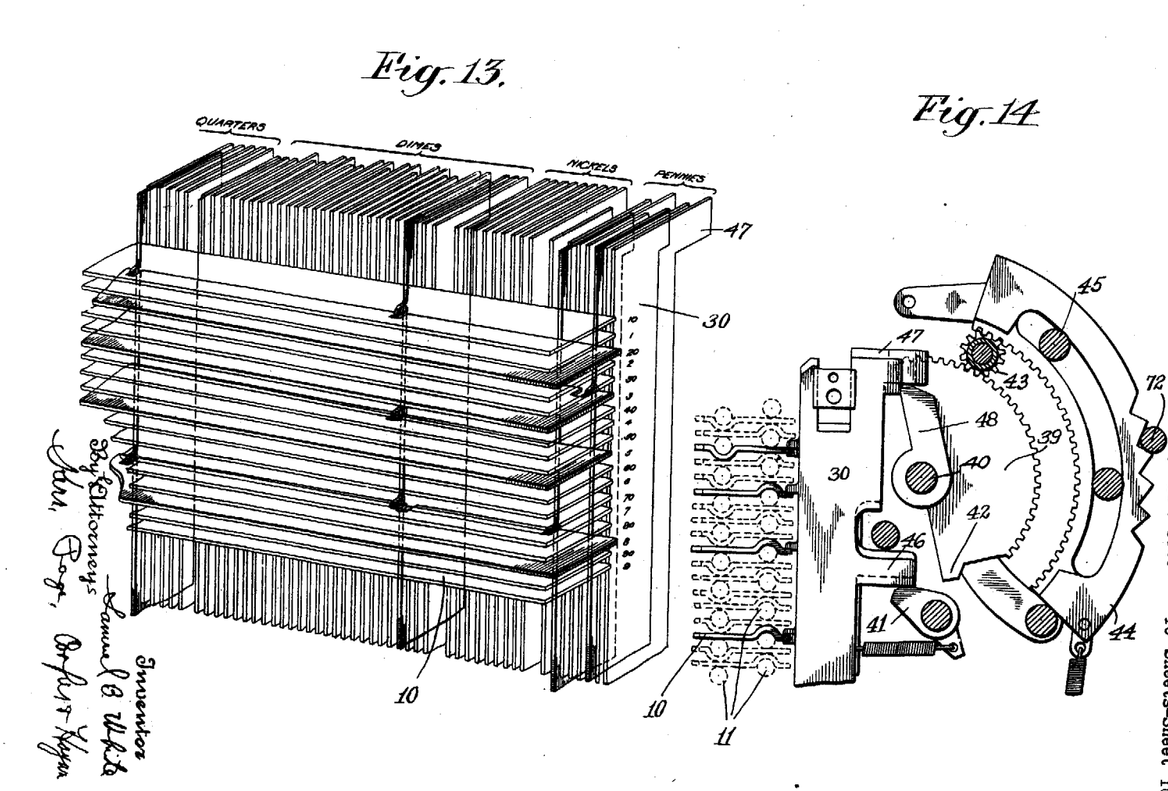

We pass now to an explanation of that peculiarity of the machine to which reference has been previously made, the number of vertical plates in each group, and for this purpose we refer to Figs. 9 to 14. In the first named figure a sufficient number of these plates for purpose of explanation is shown, and in Fig. 10 the means for bringing any given value to the indicating or printing position. These figures show the parts in their normal position, and it will be noted that none of the horizontal plates have been shifted, and that all of the vertical plates are locked up, as by means of the projections 32 overlying one or more horizontal plates. In Fig. 10 the segmental plate 39 is locked against rotation by the stop 41, and the segment 44 is in its normal position.

Assume, now, that the amount of 23 cents is to be printed and indicated. This means that the machine should register two dimes and three cents, which is the smallest number of available coins that go to make up this amount. The operator accordingly depresses the key 2 in the second column to the left, which corresponds to twenty cents, and the key 3 in the first or penny column. The first key unlocks the third plate from the top of the group of horizontals which corresponds to two dimes, and this brings a notch in the central part of the plate under the projection on the vertical plate which corresponds to two dimes. There may be other projections on this vertical plate, but in the normal position of the other horizontals notches lie under such projections, so that with the horizontal plate named moved the proper vertical is left free to drop.

The operator then depresses the 3 key in the first column. This unlocks the sixth horizontal plate from the top of the group which corresponds to three cents and brings a notch in that plate under a projection in the vertical plate which corresponds to 3 pennies.

Then by the operation of the handle the segment 39 of the primary group of verticals is moved until the stop 48 strikes the projection on the dropped vertical so that the penny indicating segment shows 3 at the window or registering point, and by a similar operation the segment for the dime group moves to permit the indicating segment to display 2. The machine will therefore print on an envelope inserted in the machine 2 in the dime column and 3 in the penny column.

Assume, however, that the amount to be registered is twenty eight cents. The least number of coins that make up this amount is one quarter and three pennies. To register this amount the operator presses the 2 key in the second column and the 8 key in the first. The first key, as before, unlocks the third horizontal plate from the top of the group, and this puts the two dime vertical in condition to drop, but it also brings a notch at the extreme left of the horizontal plate under a notch in one of the verticals which correspond to quarters. This vertical is not free to drop, however, because another projection thereon rests upon the third plate from the bottom of the group.

This latter plate is the one that is unlocked by the 8 penny key, and when it is shifted it brings the notch at its end under the quarter vertical, thus putting that vertical in condition to drop, but at the same time it shifts a notch which it also contains that lay under the two dime vertical so that vertical is locked up. At the same time it brings a notch under the projection on the eight penny vertical so that by the operation of the handle that vertical is dropped and the penny segment 39 is rotated until it encounters the projection at the top of said vertical. This results, not in the exposure of eight on the segment 44 and the printing of eight, but of the Figure 3, as the eight vertical always indicates three more than five, or one nickel and three pennies.

This plan is followed out in all other cases. The number of projections on the verticals, the number and position of the notches on the horizontals may all be worked out empirically without difficulty, so that whatever amounts are registered the least number of bills or coins that are needed to make up such amounts will be shown and printed. Whether this arrangement may be more readily worked out mathematically it is not necessary to enquire.

The apparatus hereinabove described forms a most practical and valuable adjunct to every large business concern where computations of this character have to be periodically made. It is not an expensive device, as the parts, while numerous, may all be quickly and cheaply made and are very largely duplicates, at least in their general construction and character.

What I claim as my invention is:—

1. In a pay roll computing machine, in combination a bank of keys, a series of registering members corresponding to bills and coins of different value, means for moving the same, intermediate selective devices comprising interengaging banks of plates, the plates of one bank being locked by means under the control of the keys, the plates of the other banks being locked by engagement with the plates of the first bank, means for releasing the plates of said second banks dependent upon the lateral adjustment of the plates of the first named bank, and projections on the plates of the second bank of varying length which afford stops for the registering members when the latter are moved.

2. In a pay roll computing machine, in combination, a bank of keys, a series of registering members corresponding to bills and coins of different value, means for moving the same, intermediate selective devices comprising two series of banks of plates movable at right angles to each other, one set of said plates being normally locked by means under the control of the keys, the other set of plates being locked by projections engaging the first named set, the said plates of the first set having notches in their edges which by the lateral adjustment of said plates permit certain of the plates of the second set to move, said second plates having projections of varying lengths which afford stops for the registering members when the latter are moved.

3. In a pay roll computing machine, the combination with a bank of keys, a series of registering members corresponding to bills and coins of different value, and means for moving the same, of intermediate selective devices comprises horizontal and vertical plates, the horizontal plates being locked by means under the control of the keys, and the vertical plates by projections that rest upon the horizontal bars, the said horizontal bars having notches in their edges which by the lateral adjustment of said plates, permit predetermined vertical plates to drop, and the vertical plates having projections of varying length which afford stops for the registering members when the latter are moved.

4. In a pay roll computing machine, the combination with a bank of keys, a series of movable registering members corresponding to bills and coins of different values, an operating handle and means under the control thereof for imparting movement to the register members, of intermediate selective members comprising a series of plates vertical and horizontal the vertical plates being normally locked in raised position by the horizontal plates, the said horizontal plates having notches at predetermined points which, upon the adjustment of said plates permit certain of the vertical plates to drop, and the vertical plates having projections of varying length which serve as stops to the moving registering members.

5. In a pay roll computing machine, the combination with a bank of keys, a series of registering members corresponding to bills and coins of different values, an operating handle and means controlled thereby for imparting movement to the registering members, of a series of horizontal plates normally locked by the keys, springs attached to said plates and adapted to be distended by the movement of the handle, whereby such horizontal plates as may be unlocked by the operation of keys are shifted, a series of vertical plates normally locked in raised position by the horizontal plates, but certain of which are adapted to drop when released by the adjustment of the unlocked horizontal plates, said vertical plates constituting stops which are encountered by the moving registering members and permit the latter to move to varying extents according to the plates encountered.

6. In a pay roll computing machine, the combination with a bank of keys, a series of registering members, and a handle for operating the machine, of a series of horizontal plates normally locked by the keys but adapted to be shifted when unlocked by the operating handle, a series of vertical plates normally locked in raised position by the horizontal plates and adapted to be put in condition to drop by the movement of the handle and to drop when released by the adjustment of the horizontal plates, normally locked toothed segments adapted to be released by the dropping of a vertical plate and to move until they encounter the dropped vertical plates, and gearing intermediate the registering members and said segments.

7. In a pay roll computing machine, the combination of a bank of keys, horizontal plates normally locked against lateral movement by the keys, the number of such plates being equal to that of the keys, a series of vertical plates greater in number than the horizontal plates and normally locked in raised position thereby, the said vertical plates being divided into groups corresponding to bills and coins of different value, an operating handle and means controlled thereby for moving those horizontal plates which may be unlocked by the keys, and for permitting such of the vertical plates as may be freed by the adjustment of the horizontal plates to drop and registering devices and means under the control of the handle for moving the same to extents determined by the conformation of the dropped vertical plates which constitute stops therefor.

8. In a pay roll computing machine, the combination of a bank of keys, movable registering devices, horizontal plates, one for each key and normally locked against lateral movement thereby, a series of vertical plates greater in number than the horizontal plates and having projections which lie over the horizontal plates and normally hold them in raised position, means for shifting such horizontal plates as may be unlocked by keys depressed to register a given amount, and means for permitting certain of the vertical plates to drop when, by the lateral adjustment of the horizontal plates, notches in the edge of the latter are brought under these projections, and to thereby serve as limiting stops for the registering devices, the notches in the horizontal plates being in such number and position that for any given value represented by the depressed keys, the vertical plates corresponding to the least number of available bills and coins which make up such value will be dropped.

In testimony whereof I hereto affix my signature.

SAMUEL B. WHITE.